United States Patent [19]

Hellwig

[11] Patent Number: 5,013,112
[45] Date of Patent: May 7, 1991

[54] COMBINED FIBER OPTIC CONDUITS AND OFFICE PANEL
[75] Inventor: John Hellwig, Toronto, Canada
[73] Assignee: Teknion Furniture Systems Inc., Downsview, Canada
[21] Appl. No.: 509,744
[22] Filed: Apr. 17, 1990
[51] Int. Cl.$^5$ .......................... G02B 6/00; G02B 6/14
[52] U.S. Cl. ................................................. 350/96.10
[58] Field of Search ...................... 350/96.10; 52/221

[56] References Cited
U.S. PATENT DOCUMENTS
4,911,510  3/1990  Jenkins ............................. 350/96.10

Primary Examiner—William L. Sikes
Assistant Examiner—Robert E. Wise

[57] ABSTRACT

An office panelling system is advantageously combined with fiber optic communication cable wherein the panels of the system are generally open in the center thereof and the vertical space of the panel is advantageously used for reducing the curvature of the cable between panels disposed at an angle. The panels have a metal framework onto the sides of which cover members are secured such that the interior of the framework is generally open. The framework includes a host of distributed passage ports therethrough for allowing communication cables and the like to pass through the framework where desired. The fiber optic communication cable is strung through the frameworks of the panels and rounds corners between panels disposed at an angle by using both the vertical and horizontal planes of the framework to provide a curvature in the cable rounding the corner between angled panels much greater than the angle of curvature of the cable if the cable was confined to a single horizontal plane for rounding the same corner. The rate of curvature of the cable is important, as in fiber optic cables light loss is encountered with any corner and the extent of the light loss increases as the radius of curvature becomes smaller. It is the general practice that the rate of curvature chould not be less than ten times the diameter of the cable.

10 Claims, 2 Drawing Sheets

COMBINED FIBER OPTIC CONDUITS AND OFFICE PANEL

FIELD OF THE INVENTION

The present invention relates to office panelling systems and in particular to office panelling systems having a fiber optic cable therein.

BACKGROUND OF THE INVENTION

A number of panelling systems are known which rely on a framework and have cover members supported either side of the framework for defining a more pleasing appearance of the panel. Such a panelling system is disclosed in our U.S. Pat. No. 4,535,577.

With the need to transmit data more quickly and effectively, the use of fiber optic cables has become common. Electrical signals are converted to impulses of light which are carried through fine strands of glass or plastic to another location, with these fine strands of glass or plastic forming part of the fiber optic cable. At the receiving end, the light pulses are converted back to electrical pulses such that the receiving equipment can interpret these signals in the normal manner. Fiber optic cables allow many more signals to be transmitted at the same time through optical fibers that can be transmitted via copper wire. A further advantage of the optical cables is that the signals being transmitted are not subject to interference from other sources, i.e. adjacent power cables, airport radar, etc. One disadvantage of using fiber optic cables is with respect to bending and the quality of the signal decreases with each bend. The generally accepted rule for bending optical fiber cables is the radius of the bend must not be less than ten times the outside diameter of the cable itself. Therefore, if the cable diameter is one quarter inch, the minimum bending rate is ten times one quarter inch which equals two and one-half inches. Often the cables are much larger and therefore the radius of the bend must be substantially higher.

Standard approaches for carrying of electrical cables are not suitable as often the radius of curvature for the transition from one panel to another panel disposed at an angle to the first panel is too great if the bend is maintained in the horizontal plane.

SUMMARY OF THE INVENTION

The present invention recognizes that the particular panels having a framework and covers on the exterior thereof have a clear center cavity which can be effectively used for stringing of fiber optic cables through the panels. Any radius of curvature of a cable about a transition point can be reduced in significance by using both the horizontal and vertical space of the panel to form the radius of curvature. In order to assist the operator and provide maximum flexibility, a host of passage ports are provided in the framework to allow the installer free access to the interior of the panels and allowing the cable to effectively utilize this vertical spacing to reduce the radius of curvature.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
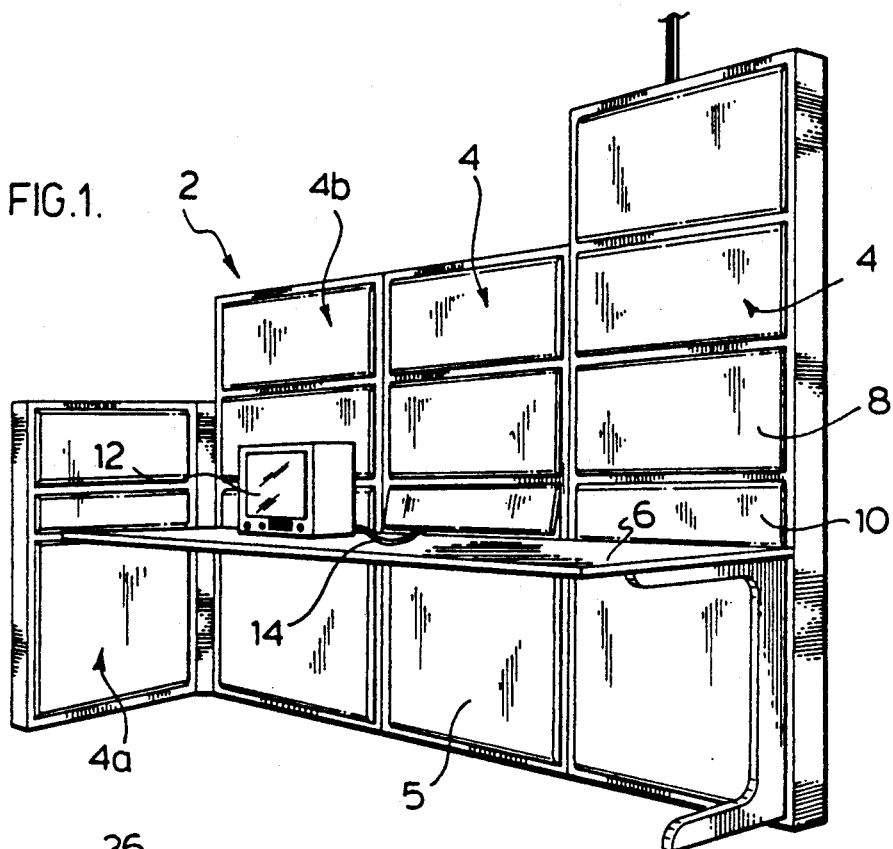
FIG. 1 is a perspective view of a number of interconnected panels assembled in a workstation type configuration.

The office panelling system, generally shown as 2, includes a number of interconnected panels 4 which support the work surface 6. Panels 4b and 4a are arranged in a 90° angle which is quite common in this type of configuration, not only for stability, but also for convenience in subdividing space. It can be appreciated that other arrangements will use other angles and office panelling systems of this type are fully flexible with respect to the particular angles between panels. The details for connecting of these panels and the method of assembling the panels can be appreciated from our U.S. Pat. No. 4,535,577, all of which is incorporated herein by reference.

The panels 4 have cover members 8 releasably secured thereto which generally conceal the framework and act as an acoustical barrier against noise transmission. As shown in our earlier patent, passageways are sometimes used and in other cases, it may be desired to have glazed panels or a glazed unit within the framework. Generally at desk height, access doors 10 are provided which allow for connection of wiring or other terminals. In this case, cable 14 is shown as leaving the panel and coming out onto the work surface 6 and connecting with the information monitor 12. Cable 14 is connected to the fiber optic supply cable by means of a converting device which converts the electrical signals of the information monitor 12 to light pulses and converts received light pulses to electrical signals suitable for said information monitor 12. The panels easily accommodate the securing of these converting devices 15 within the panel.

Figure 2:
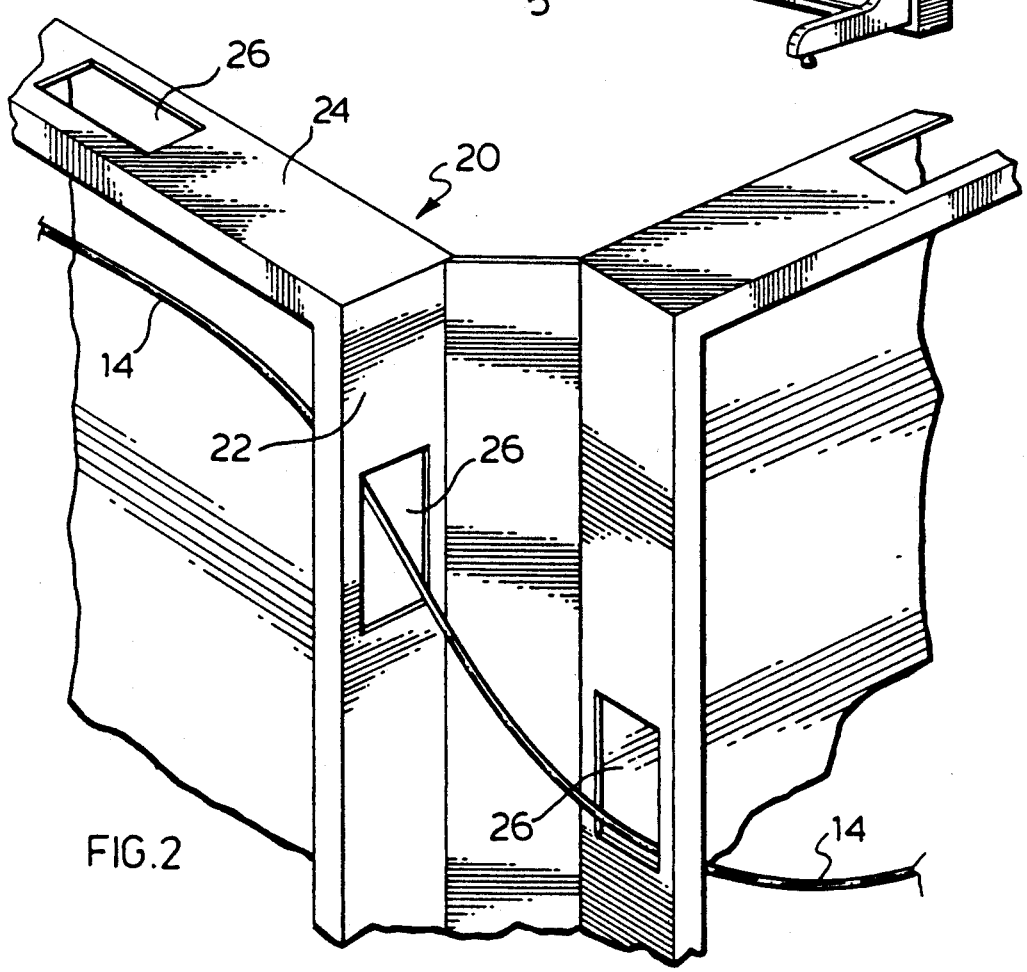
FIG. 2 is a partial perspective view showing the transition of a fiber optic cable from one panel to a connected angle panel.
Figure 3:
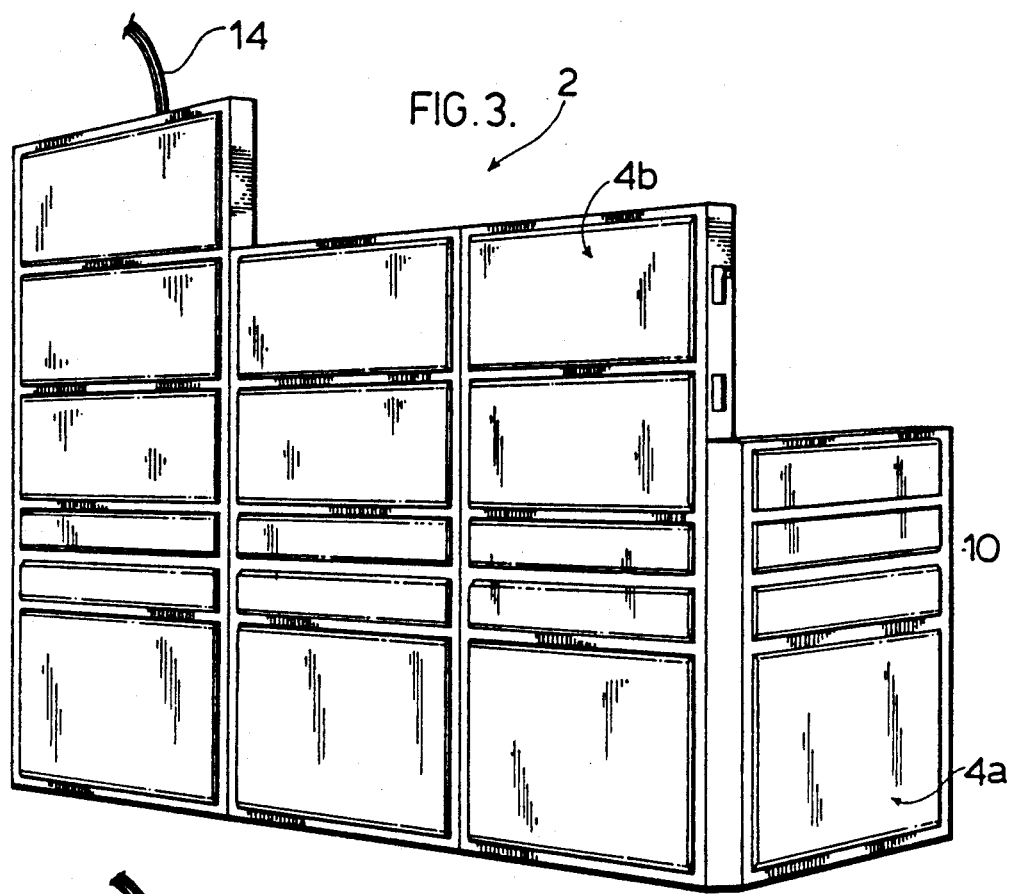
FIG. 3 shows the panel configuration of one with all the cover members in place.
Figure 4:
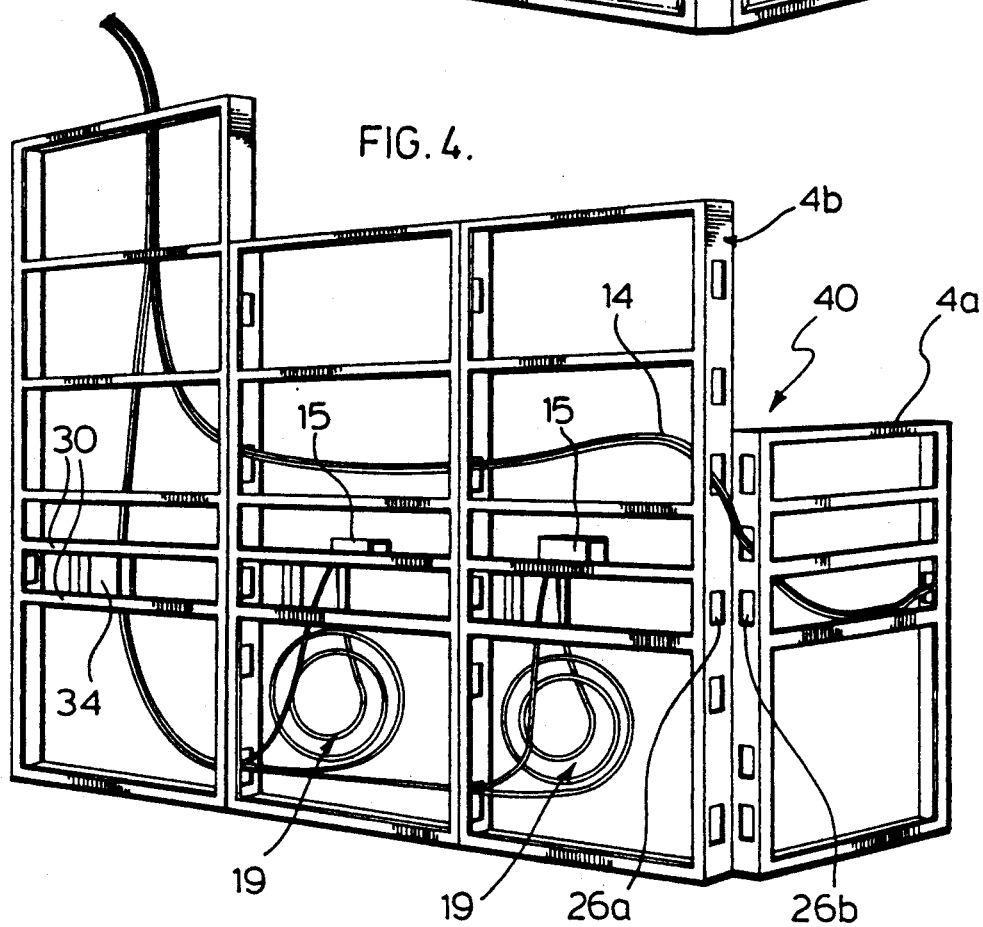
FIG. 4 is a perspective view similar to FIG. 3 with the covers removed to illustrate how fiber optic cables can be strung within the interior of the panels.

As shown in FIG. 2 and FIG. 4, each panel includes a rectangular framework 20 comprising vertical members 22 and horizontal members 24. Within these vertical members 22 and horizontal members 24 are passage ports 26. Ports are distributed throughout these members to allow full use of the interior space of the panels. In FIG. 4, it can be seen that there are a number of horizontal extending members 30, generally within the height of the lower panel, and these members define an electrical raceway for conventional cables running horizontally. This raceway can be traversed by means of a passageway, shown as 34, which maintains the electrical conduit, but provides a small passageway through which cables can be fed. In the case of fiber optic cables, there is no electrical requirement or code, as they are harmless. Thus, the fiber optic cables are not confined to this electrical conduit extending horizontally and the cables can pass freely through the interior cavity of the framework. The host of distributed passage ports provides full flexibility and the use of the vertical space, as generally indicated at 40, shows how the fiber optic cables 14 pass in a generally vertical direction and the radius of curvature of the cable to accommodate the transition from the edge of panel 4b to panel 4a results in the radius being shallow with little loss of light. This is in contrast to common practice of feeding cables through limited raceways which are horizontal and would require such a cable in this system to be fed through horizontally aligned passage ports. Such an approach limiting the cables to a horizontal plane, require very rapid transitions of the cable and thus a small radius of curvature. Small radius of curvature results in substantial light loss and a number of such transitions may well render the signal unsuitable for reproduction.

The panels preferably have a depth of three inches or less and with a four foot high panel it is easily possible to satisfactorily round a 90 degree corner with a radius of curvature of ten inches. Thus a one inch cable could easily be used. With a four foot section, the lower section 5 of the panel is about 20 inches in height which allows gentle bending of the fiber optic cable to accommodate transitions between panels or within panels. This area also acts as a storage area, as indicated in FIG. 2, for storing a large radius coil of an extra length of fibre optic cable. With this arrangement, the cutting of the fibre optic cable and creating a new termination, which is a slow and costly process, is avoided. The large space available allows the cable to be stored as a large radius coil 19 (FIG. 4) and there is no significant loss of light. The electrical raceway and communication is generally there above and will have a number of vertical or angled ports to allow the fiber optic cables to pass therethrough.

As can be seen in FIG. 4, a host of passage ports are provided both horizontally and vertically within the panelling system to allow full use of the vertical space of the panels when required.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In combination, an office panelling system and fiber optic communication cable, said office panelling system comprising interconnected panels, said panels interconnecting in a straight line or at angles, including 90 degrees, each panel having a metal framework onto the sides of which cover members are secured with the interior of said framework generally available for receiving said fiber optic cable, said framework having vertical and horizontal structural members with said structural members including a host of distributed passage ports therethrough for allowing communication cables and the like to pass through said framework where desired; said fiber optic communication cable being strung through the frameworks of said panels and rounding corners between panels at an angle by using both the vertical and horizontal planes of the framework and appropriate passage ports in said structural members to provide a curvature in said cable rounding the corner of said angled panels much greater than an angle of curvature of the cable if the cable was confined to a single horizontal plane for rounding the same corner.

2. In combination as claimed in claim 1, wherein at least two of said panels are generally perpendicular to each other and said cable rounds the corner therebetween, said panels having a depth of less than three inches and the radius of curvature of said cable about said corner is greater than ten inches.

3. In combination as claimed in claim 1, further including a plurality of light transmitting cables strung through said panels with at least several of said light transmitting cables gently rounding a horizontally abrupt transition between angled panels by angling the cable with respect to the vertical and horizontal and using appropriate passage ports in said structural members whereby the vertical space of the panels is used to smooth the transition.

4. In combination as claimed in claim 3, wherein said frameworks include a generally open space of at least 20 inches in height.

5. In combination as claimed in claim 1, wherein said cable is of a diameter between one-half inch and one inch and the minimum radius of curvature of the cable is greater than ten times the diameter.

6. In combination an office panelling system and fiber optic cables, said office panelling system comprising a number of interconnected panels, each panel having a framework to which decorative and/or functional panels are secured either side thereof, said fiber optic cables being strung through the panels by passing through selected ports in said frameworks from a host of ports spaced in said frameworks, said cables using open space within said frameworks to reduce the rate of required transition for cables extending between panels generally at an angle, one to the other.

7. In combination as claimed in claim 6, wherein some of the panels are disposed at an angle of about 90°.

8. In combination as claimed in claim 7, wherein generally the full height of the panel is available to reduce the rate of transition of the cables between panels disposed at a 90° angle.

9. In combination as claimed in claim 7, wherein at least some of said cables terminate in a converter device for converting signals to or from optical to electrical with said converter secured within a respective panel.

10. In combination as claimed in claim 6, wherein at least some of said optic cables are of a length greater than the actual length required and a portion of the open space within the panels is used to accommodate a large radius coiled portion of said at least some of said cables generally corresponding to the length of fibre optic cable greater than the actual length required.

* * * * *